United States Patent [19]
Yu

[11] Patent Number: 6,014,298
[45] Date of Patent: *Jan. 11, 2000

[54] ELECTROSTATIC PROTECTION CIRCUIT OF AN INTEGRATED CIRCUIT

[75] Inventor: Ta-Lee Yu, Hsinchu Hsien, Taiwan

[73] Assignee: Winbond Electronics Corporation, Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 09/067,860

[22] Filed: Apr. 27, 1998

[30] Foreign Application Priority Data

Nov. 28, 1997 [TW] Taiwan .................................. 86117971

[51] Int. Cl.$^7$ ....................................................... H02H 9/00
[52] U.S. Cl. ............................... 361/56; 361/111; 361/58; 361/91.3
[58] Field of Search ............................ 361/56, 58, 91.1, 361/91.3, 110, 111; 257/355

[56] References Cited

U.S. PATENT DOCUMENTS

| | | | |
|---|---|---|---|
| 4,860,148 | 8/1989 | Iwamura et al. | 361/58 |
| 5,218,506 | 6/1993 | Harris | 361/56 |
| 5,440,162 | 8/1995 | Worley et al. | 361/56 |
| 5,559,659 | 9/1996 | Strauss | 361/56 |
| 5,771,140 | 6/1998 | Kim | 361/56 |

*Primary Examiner*—Jeffrey Gaffin
*Assistant Examiner*—Kim Huynh
*Attorney, Agent, or Firm*—Fish & Richardson P.C.

[57] ABSTRACT

The protection circuit of the invention connects in series with an internal circuit between a first power source and a second power source. The protection circuit includes a switch which is connected with the internal circuit and one of the first power source and a second power source; and a delay circuit which connects with the switch. The switch which is controlled by the delay circuit is closed for providing a voltage to the internal circuit in normal operation mode, and is opened when an electrostatic stress occurs.

17 Claims, 4 Drawing Sheets

Figure 1:
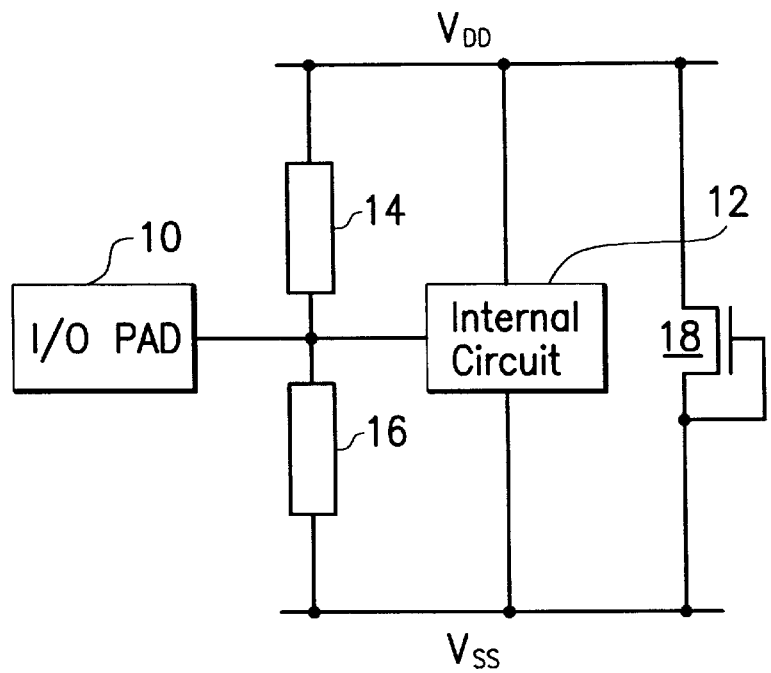
Figure 2:
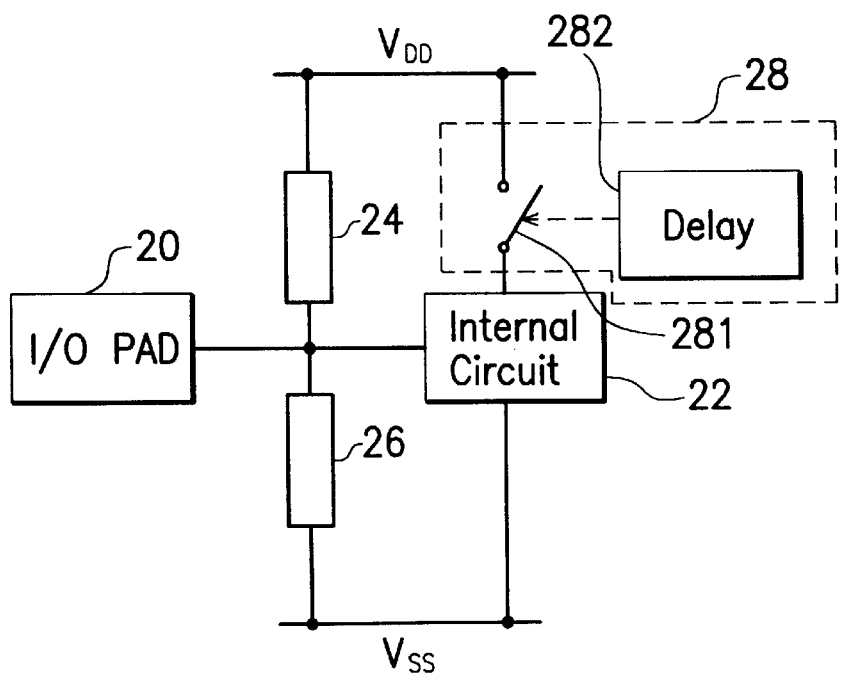

ELECTROSTATIC PROTECTION CIRCUIT OF AN INTEGRATED CIRCUIT

BACKGROUND OF THE INVENTION

1. Field of the Invention

The invention relates to a semiconductor integrated circuit, and more specifically, to an electrostatic protection circuit between electrical sources and the internal circuitry of the semiconductor integrated circuit.

2. Description of Related Art

Electrostatic discharge effect occurs in almost all processes of testing, packaging and utilizing an integrated circuit. An efficient electrostatic protection circuit is therefore required to discharge the current stress, or the integrated circuit will be damaged. Referring to FIG. 1, a conventional electrostatic protection circuit is arranged near an input/output pad 10 which connects to the internal circuitry (or core circuitry) 12 of the integrated circuit. The electrostatic protection circuit includes two protection elements 14 and 16, which connect between a voltage source VDD and the input/output pad 10, and between the input/output pad 10 and another voltage source VSS, respectively. The protection elements are, for example, diodes or MOS transistors. In general, the voltage source VDD provides a voltage of 5 V or 3.3 V, whereas the voltage source VSS is 0 V.

However, as the protection elements 14 and 16 of the conventional protection circuit provide direct discharge paths between the voltage source VDD and the input/output pad 10, and between the input/output pad 10 and the voltage source VSS, the discharge current will pull up the voltage level of the voltage sources VDD and VSS when stress is applied thereon, thereby damaging the internal circuitry 12, subsequently.

As X. Guggenmos proposed in "A New ESD Protection Concept for VLSI CMOS Circuits Avoiding Circuit Stressing," EOS/ESD Symp. Proc. EOS-13, 1991, pp.74–82, the stress on the voltage sources VDD and VSS can be reduced by introducing an NMOS transistor in the protection circuit. Referring to FIG. 1, the NMOS transistor 18 is connected between the voltage sources VDD and VSS. The drain of the NMOS transistor is connected to voltage source VDD, whereas the gate and source are connected to the voltage source VSS. The NMOS transistor 18 therefore provides a direct current path between the two voltage sources VDD and VSS.

The aforementioned modification of the protection circuit, however, occupies a large area since the NMOS transistor requires a channel width of about 4000–5000 μm. The protection circuit can hardly be assembled with highly-integrated small-dimension semiconductor devices. Therefore, an effective and small protection circuit is required.

SUMMARY OF THE INVENTION

Accordingly, the invention provides a small-dimension electrostatic protection circuit to satisfy the requirement of a high-density integrated circuit.

The electrostatic protection circuit of the invention further provides an effective discharge function between voltage sources, thereby improving the performance of the integrated circuit.

The protection circuit of the invention connects in series with an internal circuit disposed between a first power source and a second power source. The protection circuit includes a switch which is connected with the internal circuit and one of the first power source and a second power source; and a delay circuit which connects with the switch. The switch which is controlled by the delay circuit is closed in order to provide a voltage to the internal circuit in normal operation mode, and is opened when an electrostatic stress occurs.

The electrostatic protection circuit of the invention therefore provides an effective discharge function between voltage sources, thereby improving the performance of the integrated circuit. Moreover, the layout area can be reduced to increase the integrity of the integrated circuit.

BRIEF DESCRIPTION OF THE DRAWINGS

FIG. 1 is a schematic diagram illustrating a conventional electrostatic protection circuit;

FIG. 2 is a schematic diagram illustrating the electrostatic protection circuit of the invention, disposed between a first power source and an integrated circuit;

FIG. 3 is the circuit diagram of a first embodiment of the invention;

FIG. 4 is the circuit diagram of a second embodiment of the invention;

FIG. 5 is the circuit diagram of a third embodiment of the invention;

FIG. 6 is the circuit diagram of a fourth embodiment of the invention; and

FIG. 7 is the circuit diagram of a fifth embodiment of the invention.

DETAILED DESCRIPTION OF THE INVENTION

Referring to FIG. 2, the protection circuit of the invention is arranged between two power sources VDD and VSS and an internal circuit 22. The internal circuitry (or core circuit) 22 is connected to an input/output (I/O) pad 20. A conventional electrostatic protection circuit has two elements 24 and 26 which connect between the I/O pad 20 and the first power source VDD, and between the I/O pad 20 and the second power source VSS, respectively. The elements 24 and 26 are, for example, diodes or MOS transistors. In normal operating mode, the first power source VDD has a voltage of 5 V or 3.3 V, whereas the second power source VSS has 0 V. The internal circuitry 22 is driven by the voltages supplied by the two power sources VDD and VSS.

The conventional protection circuit, including the elements 24 and 26 provides, however, merely two direct discharge paths between the I/O pad 20 and the first power source VDD, and between the I/O pad 20 and the second power source VSS. When an electrostatic current occurs, the discharged electrostatic stress over the power sources VDD and VSS might raise the voltage level thereof, thus damaging the internal circuitry 22. The protection circuit 28 of the invention is therefore required to prevent this situation.

The protection circuit 28 of the invention lies in the midst of the power supply path from the power sources to the internal circuitry 22. Therefore, the protection circuit connects either between the first power source VDD and the internal circuitry, or between the internal circuit 22 and the second power source VSS. When an electrostatic current occurs, and the voltage level of the first power source VDD or that of the second power source VSS is pulled up, the high voltage stress is isolated from the internal circuitry 22 by the protection circuit 28 which blocks the power supply path to the internal circuitry 22. The power supply path is reconnected by the protection circuit 28 when the voltage across the power sources has dropped to a safe level, thereby supplying power to the internal circuitry 22 for normal operation. FIG. 2 demonstrates an example of arranging the protection circuit 28 between the first power source VDD and the internal circuit 22.

Referring to FIG. 2, the protection circuit 28 of the invention includes a switch 281 and a delay circuit 282. The switch 281 is controlled by the delay circuit 282. When an electrostatic current occurs, the delay circuit 282 causes the switch 281 to open, thereby blocking the power-supply path to the internal circuitry 22. The switch 281 is closed for supplying power to the internal circuitry 22 in normal operating mode. Thus, it seems that the protection circuit 28 does not exist when the internal circuitry 22 is driven by the voltages from the power sources through the power-supply path in the normal operating mode.

Figure 3:
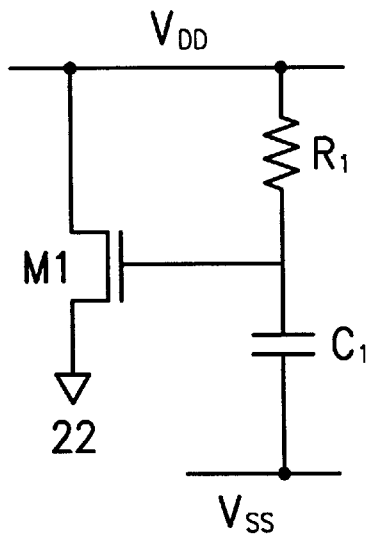

Referring to FIG. 3, the protection circuit 28 of a first embodiment of the invention includes an NMOS transistor M1, a resistor R1, and a capacitor C1. Serving as the switch 281 of the protection circuit, the NMOS transistor M1 has its drain and source connected to the first power source VDD and the internal circuitry 22, respectively. The delay circuit 282 of the protection circuit consists of the resistor R1 and capacitor C1. The resistor R1 is connected between the first power source VDD and the gate of the NMOS transistor M1. The capacitor C1 is connected between the second power source VSS and the gate of the NMOS transistor M1.

When an electrostatic voltage appears at the I/O pad 20, the floating first power source VDD has a voltage of about 0 V, thus pulling down the gate voltage of the NMOS transistor M1 to about 0 V. The NMOS transistor M1 is therefore turned off to isolate the internal circuitry 22 from the first power source VDD. Accordingly, even though the electrostatic current is discharged through the protection element 24 or 26 to raise the voltage level of the power source VDD or VSS, the internal circuitry 22 is not damaged.

Since the first power source VDD has a voltage of about 5 V or 3.3 V in normal operating mode, the capacitor C1 is recharged through the resistor R1 to raise the gate voltage of the NMOS transistor M1. When the gate voltage is high enough to turn on the NMOS transistor M1, the voltages of the power sources VDD and VSS can be applied to the internal circuitry 22. As the human body electrostatic discharge impulse has a width of about 150–300 ns, and the time required to raise the voltage of the first power source VDD to a normal operating level is about 5–100 ms, the RC time constant of the capacitor C1 and resistor R1 should be between 200 and 500 ns.

Figure 4:
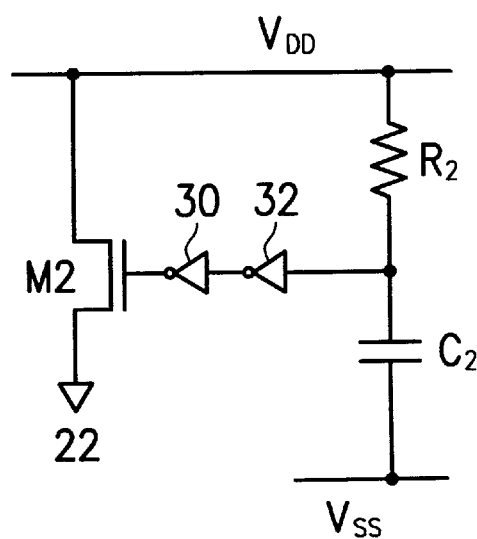

Referring to FIG. 4, the protection circuit of a second embodiment of the invention includes an NMOS transistor M2, a resistor R2, a capacitor C2 and two inverters 30 and 32 connected in series. The drain and source of the NMOS transistor M2 are connected to the first power source VDD and the internal circuitry 22, respectively, thus serving as the switch 281 of the protection circuit. The delay circuit 282 of the protection circuit consists of the resistor R2 and capacitor C2. The resistor R2 is connected between the first power source VDD and one terminal of the inverters. The capacitor C2 is connected between the second power source VSS and connection point of the resistor R2 and inverters. The other terminal of the inverters is connected to the gate of the NMOS transistor M1.

When an electrostatic current appears at the I/O pad 20, the floating first power source VDD has a voltage of about 0 V, thus pulling down the gate voltage of the NMOS transistor M2 to about 0 V. The NMOS transistor M2 is therefore turned off to isolate the internal circuitry 22 from the first power source VDD. Accordingly, even though the electrostatic current is discharged through the protection element 24 or 26 to raise the voltage level of the power source VDD or VSS, the internal circuitry 22 is not damaged.

Since the first power source VDD has a voltage of about 5 V or 3.3 V in normal operating mode, the capacitor C2 is recharged through the resistor R2 to raise the gate voltage of the NMOS transistor M2. When the gate voltage is high enough to turn on the NMOS transistor M2, the voltages of the power sources VDD and VSS can be applied to the internal circuit 22. As the human body electrostatic discharge impulse has a width of about 150–300 ns, and the time required to raise the voltage of the first power source VDD to a normal operating level is about 5–100 ms, the RC time constant of the capacitor C1 and resistor R1 should be about 200–500 ns.

Figure 5:
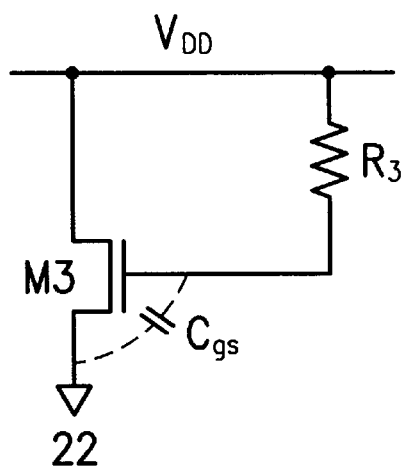

Referring to FIG. 5, the protection circuit of a third embodiment of the invention includes an NMOS transistor M3 and a resistor R3. Serving as the switch 281 of the protection circuit, the drain and source of the NMOS transistor M3 are connected to the first power source VDD and the internal circuitry 22, respectively. The resistor R3, serving as the delay circuit 282 of the protection circuit, is connected between the first power source VDD and the gate of the NMOS transistor M3.

When an electrostatic current appears at the I/O pad 20, the floating first power source VDD has a voltage of about 0 V, thus pulling down the gate voltage of the HMOs transistor M3 to about 0 V. The HMOS transistor M3 is therefore turned off to isolate the internal circuitry 22 from the first power source VDD. Accordingly, even though the electrostatic current is discharged through the protection element 24 or 26 to raise the voltage level of the power line VDD or VSS, the internal circuitry 22 is not discharged.

Since the first power source VDD has a voltage of about 5 V or 3.3 V in normal operating mode, the gate-source junction capacitor Cgs of the NMOS transistor is recharged through the resistor R3 to raise the gate voltage. When the gate voltage is high enough to turn on the NMOS transistor M3, the voltages of the power sources VDD and VSS can be applied to the internal circuitry 22. As the human body electrostatic discharge impulse has a width of about 150–300 ns, and the time required to raise the voltage of the first power source VDD to a normal operating level is about 5–100 ms, the RC time constant of the junction capacitor Cgs and resistor R3 should be about 200–500 ns.

Figure 6:
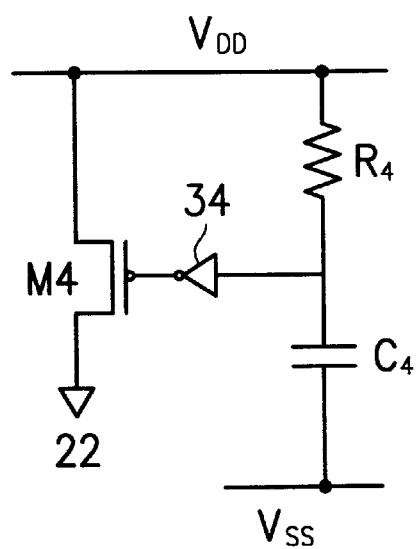

Referring to FIG. 6, the protection circuit of a fourth embodiment of the invention includes an PMOS transistor M4, a resistor R4, a capacitor C4 and an inverter 34. Serving as the switch 281 of the protection circuit, the source and drain of the PMOS transistor M4 are connected to the first power source VDD and the internal circuitry 22, respectively. The delay circuit 282 of the protection circuit is composed of the resistor R4, capacitor C4 and inverter 34. The resistor R4 is connected between the first power source VDD and the input end of the inverter 34. The capacitor C4 is connected between the second power source VSS and the input end of the inverter 34. The output end of the inverter 34 is connected to the gate of the PMOS transistor M4.

When an electrostatic current appears at the I/O pad 20, the floating first power source VDD has a voltage of about 0 V, thus pulling up the gate voltage of the PMOS transistor M4 through the inverter 34. The PMOS transistor M4 is therefore turned off to isolate the internal circuit 22 from the first power source VDD. Accordingly, even though the electrostatic current is discharged through the protection element 24 or 26 to raise the voltage level of the power line VDD or VSS, the internal circuitry 22 is not damaged.

Since the first power source VDD has a voltage of about 5 V or 3.3 V in normal operating mode, the capacitor C4 is recharged through the resistor R4, and the gate voltage of the PMOS transistor M4 is pulled down by the inverter 34. When the gate voltage is low enough to turn on the PMOS transistor M4, the voltages of the power sources VDD and VSS can be applied to the internal circuitry 22. As the human body electrostatic discharge impulse has a width of about 150–300 ns, and the time required to raise the voltage of the first power source VDD to a normal operating level is about 5–100 ms, the RC time constant of the capacitor C4 and resistor R4 should be about 200–500 ns.

Figure 7:
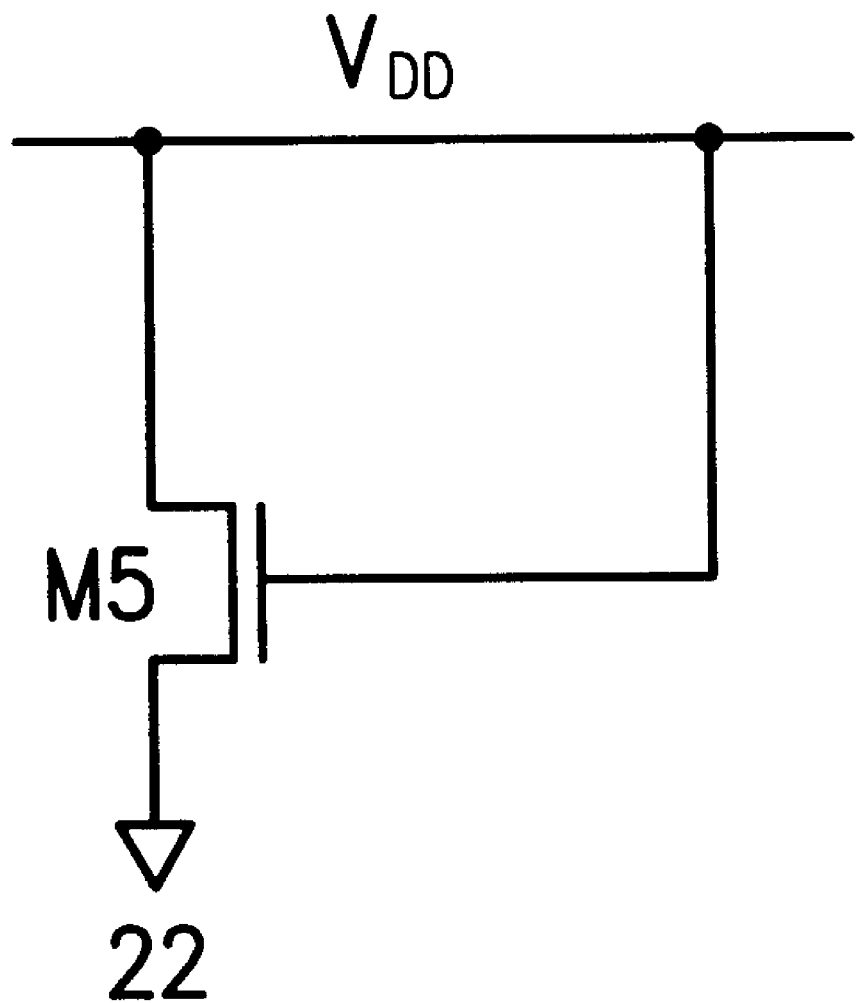

Referring to FIG. 7, the protection circuit of a fifth embodiment of the invention includes merely an NMOS transistor M5. Without delay circuit 282, the protection circuit has the NMOS transistor MS serving as the switch 281. The drain and gate of the NMOS transistor MS are connected to the first power source VDD, and the source is connected to the internal circuitry 22.

When an electrostatic current appears at the I/O pad 20, the floating first power source VDD has a voltage of about 0 V, thus pulling down the gate voltage of the NMOS transistor MS to about 0 V. The NMOS transistor MS is therefore turned off to isolate the internal circuit 22 from the first power source VDD. Accordingly, even though the electrostatic current is discharged through the protection element 24 or 26 to raise the voltage level of the power source VDD or VSS, the internal circuitry 22 is not damaged.

Since the first power source VDD has a voltage of about 5 V or 3.3 V in normal operating mode, the gate connected thereon has a voltage high enough to turn on the transistor M5. Therefore, the voltages of the power sources VDD and VSS can be applied to the internal circuitry 22 for normal operation.

Accordingly, the protection circuit of the invention is in the midst of the power supply path from the power sources to the internal circuitry 22. Therefore, the protection circuit connects either between the first power source VDD and the internal circuitry, or between the internal circuitry 22 and the second power source VSS. When an electrostatic discharge occurs, and the voltage level of the first power source VDD or that of the second power source VSS is pulled up, the high voltage stress is isolated from the internal circuitry 22 by the protection circuit which blocks the power supply path to the internal circuitry 22. The power supply path is reconnected by the protection circuit 28 when the voltage across the power sources has dropped to a safe level, thereby supplying power to the internal circuitry 22 for normal operation. Therefore, the electrostatic protection circuit of the invention provides an effective discharge function between voltage sources, thereby improving the performance of the integrated circuit. Moreover, the layout area of the protection circuit can be reduced to increase the density of the integrated circuit.

What is claimed is:

1. A circuit for protecting an internal circuit, comprising:
   a pair of series electrostatic protection devices having a common node connected to an IC pad which is directly connected to the internal circuit;
   a switch connected the internal circuit and one of a first power source and a second power source;
   a delay circuit for providing a RC time delay to the switch; wherein the internal circuit is powered by the first power source and the second power source in normal operation while the switch is turned on, and the internal circuit is blocked from one of the first power source and the second sower source during an ESD event while the switch is turned off for at least a period of the RC time delay.

2. The protection circuit as claimed in claim 1, wherein the switch is connected between the internal circuit and the first power source.

3. The protection circuit as claimed in claim 2, wherein the first power source has a voltage level higher than that of the second power source in the normal operation mode.

4. The protection circuit as claimed in claim 3, wherein the switch is an NMOS transistor which has a drain connected to the first power source, a source connected to the internal circuit, and a gate controlled by the delay circuit.

5. The protection circuit as claimed in claim 4, wherein the delay circuit comprises:
   a resistor connected between the first power source and the gate of the NMOS transistor; and
   a capacitor connected between the gate of the NMOS transistor and the second power source.

6. The protection circuit as claimed in claim 4, wherein the delay circuit comprises:
   two inverters connected in series;
   a resistor which has one terminal connected to the first power source and another terminal connected to the gate of the NMOS transistor through the inverters; and
   a capacitor which has one electrode connected to the second power source and another electrode connected to the gate of the NMOS transistor through the inverters.

7. The protection circuit as claimed in claim 4, wherein the delay circuit is a resistor connected between the first power source and the gate of the NMOS transistor.

8. The protection circuit as claimed in claim 3, wherein the switch is a PMOS transistor which has a drain connected to the internal circuit, a source connected to the first power source, and a gate controlled by the delay circuit.

9. The protection circuit as claimed in claim 8, wherein the delay circuit comprises:
   an inverter;
   a resistor which has one terminal connected to the first power source and another terminal connected to the gate of the PMOS transistor through the inverter; and
   a capacitor which has one electrode connected to the second power source and another electrode connected to the gate of the PMOS transistor through the inverter.

10. A protection circuit for protecting an internal circuit within an integrated circuit, the protection circuit comprising:
    an IC pad directly connected to the internal circuit;
    a switch connected with the internal circuit and one of a first power rail and a second power rail; and
    a delay means for providing a time delay for the switch; wherein the internal circuit is powered through the first power rail and the second power rail in normal operation while the switch is turned on, and the internal circuit is blocked from one of said power rails when ESD stresses at the one power rail while the switch is turned off for at least a period of the time delay.

11. The protection circuit as claimed in claim 10, wherein the switch is connected between the internal circuit and the first power rail.

12. The protection circuit as claimed in claim 11, wherein the switch is an NMOS transistor having one source/drain connected to said first power rail, another source/drain connected to said internal circuit, and a gate controlled by said delay means.

13. The protection circuit as claimed in claim 12, wherein the delay means comprises:
- a resistor connected between the first power rail and the gate of the NMOS transistor; and
- a capacitor connected between the second power rail and the gate of the NMOS transistor.

14. The protection circuit as claimed in claim 12, wherein said delay means comprises:
- two inverters connected in series;
- a resistor having one terminal connected to the first power rail and another terminal coupled to the gate of the NMOS transistor by the inverters; and
- a capacitor having one electrode connected to the second power rail and another electrode coupled to the gate of the NMOS transistor by the inverters.

15. The protection circuit as claimed in claim 12, wherein said delay means is a resistor connected between the first power rail and the gate of the NMOS transistor.

16. The protection circuit as claimed in claim 11, wherein the switch is an PMOS transistor having one source/drain connected to said first power rail, another source/drain connected to said internal circuit, and a gate controlled by said delay means.

17. The protection circuit as claimed in claim 16, wherein said delay means comprises:
- an inverter;
- a resistor having one terminal connected to the first power rail and another terminal coupled to the gate of the NMOS transistor by the inverter; and
- a capacitor having one electrode connected to the second power rail and another electrode coupled to the gate of the NMOS transistor by the inverter.

* * * * *